Patented Jan. 9, 1940

2,186,894

UNITED STATES PATENT OFFICE 2,186,894

TREATING FIBROUS MATERIALS

Karl Brodersen and Matthias Quaedvlieg, Dessau in Anhalt, Germany, assignors to General Aniline Works, Inc., New York, N. Y., a corporation of Delaware No Drawing. Application January 8, 1938, Serial No. 184,036. In Germany January 14, 1937

5 Claims. (Cl. 8—74)

Our present invention relates to a new process for treating fibrous materials.

In general, the known preparations, which are of widely different kinds, for treating fibrous materials must, in order to produce any considerable effect, be used in relatively large quantity, at best amounting to more than 2 grams per liter of the treating bath.

This invention is based on the observation that the products of reaction of the aliphatic amines of high molecular weight with compounds derived from cyanamide or a salt thereof and an alkylene oxide are highly effective as textile treating agents, even in extraordinarily low concentration. Instead of using an alkylene oxide, a chlorhydrin may be used, which gives rise to an alkylene oxide in the presence of alkali. Thus, for example, from sodium cyanamide and ethylene oxide or ethylene chlorhydrin there is produced an aminooxazoline, for instance, according to the following scheme:

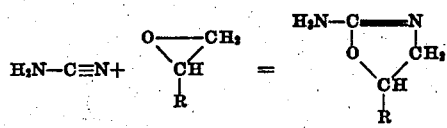

R means hydrogen, alkyl, or chloroalkyl.

These aminooxazolines readily add a molecule of, for example, stearylamine hydrochloride, probably according to the equation

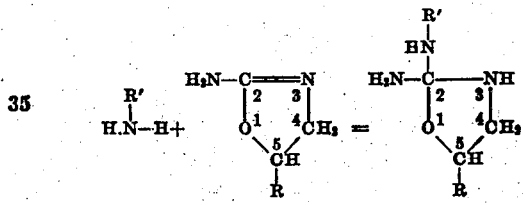

R' meaning an alkyl radicle with at least 8 carbon atoms.

A still more effective agent is obtained if these compounds or especially those derived from a dichlorhydrin and sodium cyanamide, probably an aminochlormethyloxazoline, are caused to react with 2 or 3 molecules of, for instance, stearylamine hydrochloride, this reaction being performed by slightly heating a mixture of the said starting materials.

The new compounds are especially useful as softening agents for artificial silk.

Instead of ethylene oxide or epichlorhydrin, the oxide of propylene, butylene or another alkylene having a straight or branched chain can be used. Primary amines can be used in the same way as secondary, and instead of fatty amines those derived from resin acids and naphthenic acids may be used with equal effect.

It must be stipulated that the reaction product contain per molecule at least one aliphatic or alicyclic residue having more than 8 carbon atoms.

The new preparations can be used for the most widely different kinds of treatment of fibrous bodies, of all kinds. They are characterized by their high quantitative efficiency as shown by the following examples, which illustrate the invention:

*Example 1.*—Unwashed viscose silk is treated with 0.05 gram per liter of the amidazoline derivative from 2 molecules of stearylamine hydrochloride and aminochloromethyloxazoline hydrochloride for about ½ hour at 45° C., washed and dried. The silk has a pleasant, full and soft feel.

*Example 2.*—If a viscose material dyed with Direct Deep Black EW extra (Schultz, Farbstofftabellen No. 671) is treated with a solution of 0.05 per cent strength of stearylamino-aminooxazolidine hydrochloride, the dyeing is rendered fast to water.

It is obvious that our invention is not limited to the foregoing examples or to the specific details given therein. Thus, for instance, any other aliphatic amine with at least 8 carbon atoms may be used for producing the condensation product with the aminooxazolines in question. Instead of primary amines secondary amines may be condensed with the aminooxazoline. Instead of artificial silk fabrics of natural fibers such as cotton or wool may be subjected to the treatment with the said products.

What I claim is:

1. The process which comprises treating fibrous materials with a diluted aqueous solution of a condensation product of an aminooxyazoline with an aliphatic amine containing more than 8 carbon atoms, said condensation product containing bound to the carbon atom in the 2-position a free amino group and a second amino group substituted by an alkyl radical with at least 8 carbon atoms.

2. The process which comprises treating fibrous materials with a diluted aqueous solution of a condensation product of one molecular proportion of an aminooxazoline with one molecular proportion of an aliphatic amine containing more than 8 carbon atoms, said condensation product containing bound to the carbon atom in the 2-position a free amino group and a second amino group-substituted by an alkyl radical with at least 8 carbon atoms.

3. The process which comprises treating fibrous materials with a diluted aqueous solution of a condensation product of one molecular proportion of an aminooxazoline with two molecular proportions of an aliphatic amine containing more than 8 carbon atoms, said condensation product containing bound to the carbon atom in the 2-position a free amino group and a second amino group substituted by an alkyl radical with at least 8 carbon atoms.

4. The process which comprises treating viscose silk in an aqueous bath containing per liter 0.5 part of 2-stearylamino-2-aminooxyazolidine.

5. The process which comprises treating viscose silk in an aqueous bath containing per liter 0.5 part of the condensation product of two molecular proportions of stearylamine hydrochloride with one molecular proportion of aminochloromethyloxazoline, said condensation product containing bound to the carbon atom in the 2-position a free amino group and a second amino group substituted by an alkyl radical with at least 8 carbon atoms.

KARL BRODERSEN.
MATTHIAS QUAEDVLIEG.